(No Model.)           2 Sheets—Sheet 1.
N. W. WALLACE.
INTRENCHING IMPLEMENT.
No. 285,188.          Patented Sept. 18, 1883.
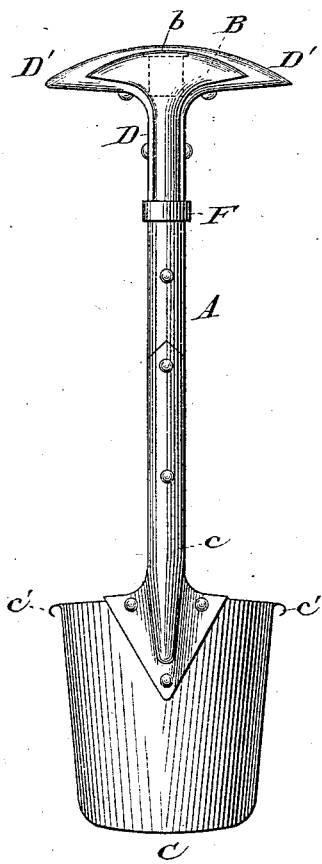
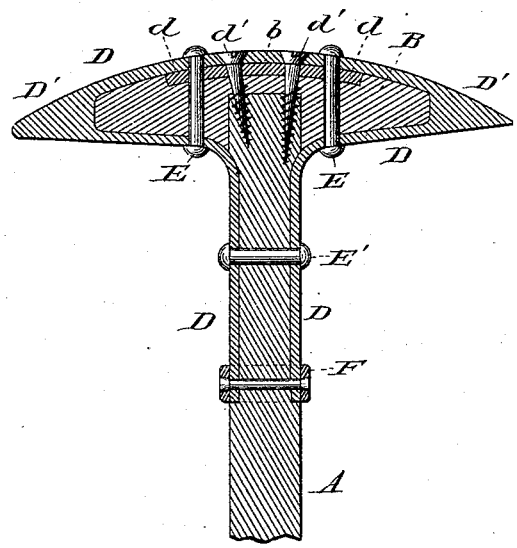
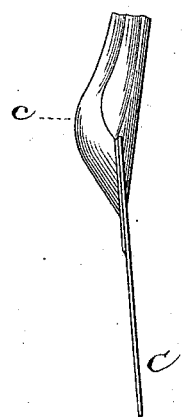
Witnesses:
Solon C. Kemon
Thos. Houghton
Inventor
N. W. Wallace
By Munn & Co.
Attorneys (No Model.) 2 Sheets—Sheet 2.
N. W. WALLACE.
INTRENCHING IMPLEMENT.
No. 285,188. Patented Sept. 18, 1883.
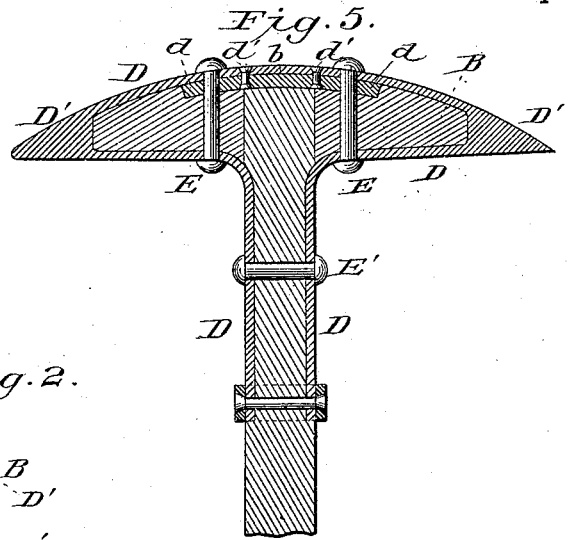
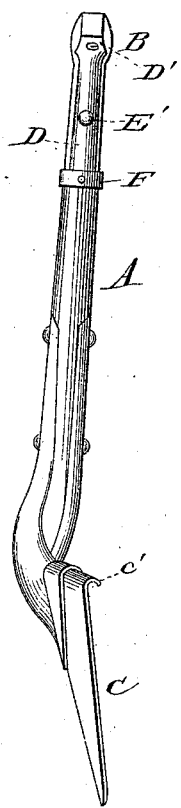
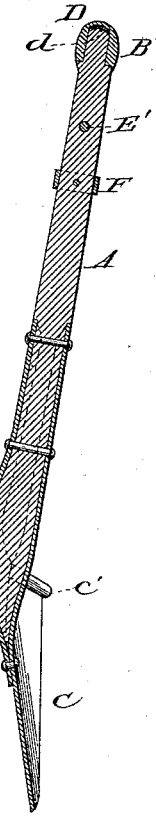
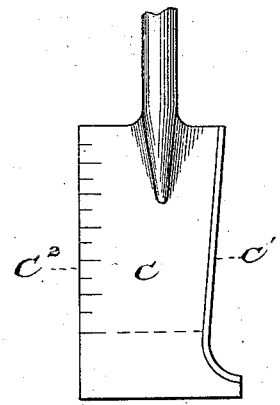
Witnesses:
Solon C. Kemon
Thos. Houghton
Inventor.
N. W. Wallace
By Munn & Co.
Attorneys

UNITED STATES PATENT OFFICE.

NESBIT WILLOUGHBY WALLACE, OF 3 HARLEY PLACE, CLIFTON, COUNTY OF GLOUCESTER, ENGLAND.

INTRENCHING IMPLEMENT.

SPECIFICATION forming part of Letters Patent No. 285,188, dated September 18, 1883.

Application filed April 18, 1883. (No model.) Patented in England January 19, 1882, No. 282; in France July 19, 1882, No. 150,190, and in Belgium July 21, 1882, No. 58,530.

*To all whom it may concern:*

Be it known that I, NESBIT WILLOUGHBY WALLACE, a subject of the Queen of Great Britain, of 3 Harley Place, Clifton, in the county of Gloucester, England, have invented a new and useful Improvement in Intrenching Implements, of which the following is a full, clear, and exact description.

My invention relates to an improved intrenching implement for military use; and it consists of a pick-handled spade, or combined spade and pick, constructed as hereinafter described.

The handle of the spade is provided with a cross-head in the form of a pick, which is sheathed and pointed with steel to enable it to be used for the purposes of a pick, while the shank and blade are of such form as to enable the implement to be conveniently used either as a pick or as a spade, and to be carried with ease as part of a soldier's accouterment.

In order that the invention may be more readily understood, I have illustrated it in the accompanying drawings, and will proceed to describe it with reference thereto.

Figure 1 is a back view, Fig. 2 a side view, and Fig. 3 a longitudinal section, of the implement, taken on line 1 1, Fig. 1. Fig. 4 is a central section, on a larger scale, of the pick-handle of the spade on line 2 2, Fig. 2. Fig. 5 is a similar section, showing a modified form of joint for the metal sheathing of the pick-head. Figs. 6 and 7 represent edge and face views of a modified form of blade to adapt the spade for surveying purposes.

The same letters of reference indicate the same parts in all the figures.

A is the shank of the handle, and B D is the cross or handle proper in the form of a pick-head. C is the blade. The shank A and the interior part, B, of the cross or pick-head are made of the hardest and toughest kind of wood, and are tenoned and mortised together, as shown in Fig. 3. The two parts are further bound strongly together by steel straps D, extending some distance down the two sides of the shank A, (in which they are countersunk,) and embracing the upper and under sides and points of the pick-head or cross, these straps forming a sheathing or armor for the pick-head and leaving the wood exposed only on the front and back faces. The working-points D' are forged solid to give the necessary weight and strength and enable it to withstand the wear, the one point being sharpened for use as a pick, and the other blunt for use as a grubber, or in the form of a hammer-head, and the metal being well tempered and very hard. The details of the mode of fixing and binding this armor-sheathing tightly against the wood may vary slightly, as shown in Figs. 4 and 5; but in either case the armor-sheathing is made in halves, (one for each limb of the pick-head,) butting together at $b$, the butt-joint being strengthened by a flitch-plate, $d$, of iron or steel, countersunk in the pick-head beneath said joint. The butting ends of the sheathing may either be held down and united to the flitch-plate $d$ by screws $d'$, passing through both and screwing into the tenon of the shank A, as shown in Fig. 4, or they may be riveted to plate $d$ by rivets $d'$, as in Fig. 5. Instead of uniting the two parts of the sheathing by a butt-joint, they may be welded or otherwise united, or be made in a single forging. In either case two rivets, E, pass completely through the armor-sheathing, the cross-head, and the flitch-plate $d$, and their upper ends are riveted down, as shown. Another rivet, E', passes through the sheathing-straps and the shank A, and the ends of the straps are still further secured by an iron band, F, shrunk on at the time of inserting the shank in the pick-head and before the rivet E' is inserted, and additionally secured by a countersunk rivet, screws, or otherwise. The object of so building up the pick-head is to combine the necessary weight, strength, and elasticity for the work for which the tool is designed. The blade C is constructed and riveted to the shank A, and is inclined at an angle to the axis of the shank, as shown. Just above the blade, at the rear of the shank, a swelling, $c$, is formed, as shown, for the purpose of guarding the knuckles of the worker when shoveling up material. The top edges of the blade are curved over, as shown at $c'$, at each side of the shank sufficiently to avoid cutting the hand when the implement is wielded as a pick, and are roughened to prevent the foot slipping when pressed on them. The blade is by preference nearly straight along its cutting-edge, so as to make a straight cut, but is gradually and considerably bellied higher up, to enable it to hold and raise as much material as possible. In using the implement as a pick it is grasped with the projection $c$ in the palm of the right hand, which enables the blade C to clear the inside of the wrist. By a slight modification of the form of the blade it is adapted for use as a bill-hook and as a surveying-tool. This form is illustrated in Figs. 6 and 7. The blade is in this case made flat and of steel, and has one edge, C', (whichever may be most convenient,) shaped like a bill-hook, as shown, while the other edge, $C^2$, is straight and marked with a graduated scale arranged so as to show a definite measurement from the top of the pick-head—say three links—the blade being extended beyond this scale to allow for wear. The implement is in any case—that is to say, whether the blade be of the form shown in Fig. 1 or of that shown in Fig. 7—made of a definite length, so that it can be used as a measure, and it may also be used with advantage for household, gardening, and other general purposes.

Having described my said invention, I would observe that I do not confine myself to the precise details of construction hereinbefore described; but

What I claim as my invention is—

1. The shank A, provided with a pick-head at one end and a spade at its opposite end, both pick and spade made rigid with the shank, substantially as described, and for the purpose set forth.

2. A pick-handled spade constructed of a shank, A, steel-sheathed cross or pick-head B D, and blade C, combined for use as specified.

3. The combination, with the shank A, pick head or handle B D, and the blade C, of the swelling $c$, substantially as and for the purposes specified.

4. The combination, with the shank of a spade, of a cross-handle, B, and of a steel sheathing, D, in the form of and adapted for use as a pick, and forming a handle to the spade, substantially as specified.

5. A combined pick, spade, and bill-hook, being a spade having a blade of the form shown attached to a shank, A, provided with a pick-head, B, substantially as described.

The foregoing specification of my improvement in intrenching implements signed by me this 10th day of March, A. D. 1883.

NESBIT WILLOUGHBY WALLACE.

Witnesses:
 GEORGE WEIN,
 A. J. WESTLAND.